Patented Oct. 13, 1931

1,827,263

UNITED STATES PATENT OFFICE

FRANK LOUIS ROMAN, OF CHICAGO, ILLINOIS, ASSIGNOR TO WESTERN ELECTRIC COMPANY, INCORPORATED, OF NEW YORK, N. Y.

COMPOSITION FOR FLAMEPROOFING INFLAMMABLE MATERIALS

No Drawing. Application filed May 21, 1927. Serial No. 193,383.

This invention relates generally to compositions for flameproofing inflammable materials, and more particularly to compositions for flameproofing insulating material, such as rubber.

An object of the invention is to provide an inexpensive, effective flameproofing composition which may be readily applied to inflammable materials to render them flameproof.

In accordance with the general features of the invention, a solution of flameproofing substances, such as mono and diammonium phosphates, is mixed with an adhesive, such as gum arabic, and if desired a plasticizer is added to render the adhesive soft and pliable. The resulting composition is applied to the surface of the material to be rendered flameproof and is then dried.

Other objects and features of the invention will be apparent from the following detailed description of a specific embodiment thereof and will be particularly pointed out in the appended claims.

Although the improved composition and method may be employed to treat various materials which it is desirable to render substantially flameproof, they are especially applicable to treating materials which are extremely difficult to flameproof. Among such materials are insulating materials, such as rubber, which are used upon electrical conductors. In the following description the invention will be described as applied to insulating materials, but it is to be understood that the invention may be practiced equally well upon other materials of an inflammable character.

In carrying out the objects of the invention in one embodiment thereof, an electrical conductor is covered with a rubber insulating compound and the insulating compound is then treated with a coat of a flameproofing composition comprising a solution of mono and diammonium phosphates mixed with an adhesive such as gum arabic to which a plasticizer such as glycerol may be added if desired to render the adhesive soft and pliable. The flameproofing material is then dried, preferably by the application of heat, and if desired one or more additional coats thereof may be applied in the same manner to the insulating compound.

One flameproofing composition which has proven very satisfactory consists of the following ingredients:

| | Parts |
|---|---|
| Monoammonium phosphate | 24 |
| Diammonium phosphate | 19 |
| Gum arabic (solid) | 45 |
| Glycerol | 30 |
| Water | 130 |

In making up this composition the mono and diammonium phosphates are dissolved in a portion of the water, the gum arabic is dissolved in the remaining portion of the water, the two solutions are thoroughly mixed and the glycerol is then incorporated in the resulting mixture.

By using a flameproofing composition consisting of the above ingredients it is possible to render substantially flameproof an insulating compound composed principally of rubber which is very inflammable. While an insulating compound treated as described above may be ignited by the direct application of a flame, the flame will not travel any appreciable distance and will be quickly extinguished.

The invention is not limited to the specific ingredients in the exact proportions indicated in the specific embodiment of the invention hereinbefore described, but the proportions of the ingredients may be varied within a wide range depending upon the characteristics desired in the finished product and also other flameproofing, adhesive and plasticizing ingredients may be substituted for those specified above. For example, other water soluble phosphates, such as triammonium phosphate, mono, di and trisodium phosphate and mono, di and tripotassium phosphate may be used in place of or in addition to the mono and diammonium phosphate. Also other adhesives such as latex, dextrine, and a mixture of dextrine and starch may be employed instead of gum arabic. When it is desired to use a plasticizer other materials such as ethylene gylcol having characteristics similar to those of glycerol may be employed in its stead. It is also advantageous to add a small amount of a preservative, such as sodium benzoate, to the composition when it is not to be used immediately after being made in order to prevent the growth of any micro-organisms which might tend to develop therein.

What is claimed is:

1. A flameproofing composition comprising substantially 24 parts of monoammonium phosphate, 19 parts of diammonium phosphate, 45 parts of gum arabic, 30 parts of glycerol, and 130 parts of water.

2. A flameproofing composition comprising a plurality of ammonium phosphates, gum arabic, glycerol, and water.

3. A flameproofing composition comprising a solution of phosphates mixed together, gum arabic, glycerol, and a small amount of sodium benzoate.

4. A flameproofing composition comprising substantially 24 parts of monoammonium phosphate, 19 parts of diammonium phosphate, 45 parts of gum arabic, 30 parts of glycerol, 130 parts of water, and a small amount of sodium benzoate.

5. A flameproofing composition comprising substantially 43 parts of a material selected from the group including monoammonium, diammonium, and triammonium phosphates, monosodium, disodium, and trisodium phosphates, and monopotassium, dipotassium, and tripotassium phosphates, 45 parts of an adhesive selected from the group including gum arabic, latex, dextrine and starch; 30 parts of a plasticizer selected from the group including glycerol and ethylene glycol; and 30 parts of water.

In witness whereof, I hereunto subscribe my name this 30th day of April, A. D. 1927.

FRANK LOUIS ROMAN.